US012252102B2

(12) United States Patent
Ganzel (10) Patent No.: US 12,252,102 B2
(45) Date of Patent: Mar. 18, 2025

(54) BRAKE SYSTEM WITH FLUID STORAGE SECONDARY BRAKE MODULE

(71) Applicant: ZF Active Safety US Inc., Livonia, MI (US)

(72) Inventor: Blaise Ganzel, Ann Arbor, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 504 days.

(21) Appl. No.: 17/667,835

(22) Filed: Feb. 9, 2022

(65) Prior Publication Data
US 2023/0227016 A1     Jul. 20, 2023

Related U.S. Application Data

(60) Provisional application No. 63/300,773, filed on Jan. 19, 2022.

(51) Int. Cl.
*B60T 13/68* (2006.01)
*B60T 8/176* (2006.01)
(Continued)

(52) U.S. Cl.
CPC ............ *B60T 13/686* (2013.01); *B60T 8/176* (2013.01); *B60T 8/326* (2013.01); *B60T 13/142* (2013.01);
(Continued)

(58) Field of Classification Search
CPC ...... B60T 13/62; B60T 13/142; B60T 13/686; B60T 8/176; B60T 8/326; B60T 8/4081;
(Continued)

(56) References Cited

U.S. PATENT DOCUMENTS 9,827,960 B2   11/2017 Feigel et al.
10,821,949 B2 * 11/2020 Henriques ............... B60T 7/042
(Continued)

FOREIGN PATENT DOCUMENTS

DE   102014225958 A1   6/2016
DE   102019216896 A1   5/2020
(Continued)

OTHER PUBLICATIONS

German Search Report for application 102023200277.9, ZF Active Safety US Inc., mailing date Sep. 8, 2023, pp. 1-8. English translation not provided

*Primary Examiner* — Christopher P Schwartz
(74) *Attorney, Agent, or Firm* — Tarolli, Sundheim, Covell & Tummino LLP (57) ABSTRACT

A brake system for actuating at least one wheel brake includes a reservoir and a master cylinder operable to provide a brake signal responsive to actuation of a brake pedal connected thereto. The master cylinder is selectively operable during a manual push-through mode to generate brake actuating pressure to at least one output for hydraulically actuating at least one wheel brake. A power transmission unit is configured for actuating at least one of the wheel brakes in a non-failure normal braking mode. A secondary braking module is configured for selectively providing hydraulic fluid to each of the wheel brakes in an enhanced braking mode. The secondary braking module includes a pump motor driving at least one pump unit. Each pump unit is operatively connected to a fluid accumulator associated with the correlated wheel brake for selectively varying an amount of hydraulic fluid provided to the wheel brake.

19 Claims, 2 Drawing Sheets (51) Int. Cl.
  *B60T 8/32* (2006.01)
  *B60T 13/14* (2006.01)
  *B60T 13/62* (2006.01)
  B60T 8/40 (2006.01)

(52) U.S. Cl.
  CPC ............ *B60T 13/62* (2013.01); *B60T 8/4081* (2013.01); *B60T 2270/10* (2013.01); *B60T 2270/402* (2013.01); *B60T 2270/404* (2013.01); *B60T 2270/82* (2013.01); *B60T 2270/88* (2013.01)

(58) Field of Classification Search
  CPC ........... B60T 2270/10; B60T 2270/402; B60T 2270/404; B60T 2270/82; B60T 2270/88
  USPC ................................ 303/10, 11, 116.2, 116.4
  See application file for complete search history.

(56) References Cited

U.S. PATENT DOCUMENTS

| | | | | |
|---|---|---|---|---|
| 2017/0274884 A1* | 9/2017 | Besier | ................... | B60T 13/686 |
| 2017/0361825 A1* | 12/2017 | Drumm | ................ | B60T 8/4081 |
| 2019/0344767 A1* | 11/2019 | Bareiss | ..................... | B60T 7/12 |
| 2020/0017090 A1* | 1/2020 | Miyoshi | ................ | B60T 8/4872 |
| 2020/0361439 A1* | 11/2020 | Neu | ..................... | B60T 13/146 |

FOREIGN PATENT DOCUMENTS

| | | |
|---|---|---|
| DE | 102018009370 A1 | 6/2020 |
| DE | 102018010168 A1 | 7/2020 |

\* cited by examiner

BRAKE SYSTEM WITH FLUID STORAGE SECONDARY BRAKE MODULE

RELATED APPLICATION

This application claims priority from U.S. Provisional Application No. 63/300,773, filed 19 Jan. 2022, the subject matter of which is incorporated herein by reference in its entirety.

TECHNICAL FIELD

This disclosure relates to an apparatus and method for use of a brake system and, more particularly, to a method and apparatus of a hydraulic brake system for actuating a pair of front brakes and a pair of rear brakes, including a secondary brake module having fluid storage capabilities.

BACKGROUND

A brake system may include anti-lock control including a pedal-operated hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include both anti-lock control and traction slip control, which can use braking pressure modulators for controlled vehicular braking.

Certain hydraulic brake systems include various enhancement features for selectively assisting with obtaining desired brake response for one or more wheel brakes in particular use environments. An example enhancement feature is "overboost" (in which higher pressure is provided to a particular brake than would normally be available from a traditional master cylinder arrangement).

SUMMARY

In an aspect, a brake system for actuating at least one wheel brake of a pair of front wheel brakes and a pair of rear wheel brakes is disclosed. The system includes a reservoir and a master cylinder operable to provide a brake signal responsive to actuation of a brake pedal connected thereto. The master cylinder is selectively operable during a manual push-through mode by actuation of the brake pedal to generate brake actuating pressure to at least one output for hydraulically actuating at least one wheel brake. A power transmission unit is configured for selectively providing pressurized hydraulic fluid for actuating at least one of the wheel brakes in a non-failure normal braking mode. A secondary braking module is configured for selectively providing hydraulic fluid to each of the wheel brakes in an enhanced braking mode. Each wheel brake has an associated fluid accumulator. The secondary braking module includes a pump motor driving at least one pump unit associated with a correlated wheel brake. Each pump unit is operatively connected to the fluid accumulator associated with the correlated wheel brake for selectively varying an amount of hydraulic fluid provided to the correlated wheel brake. A primary electronic control unit controls the power transmission unit responsive to the brake signal. A secondary electronic control unit controls the pump motor responsive to the brake signal. First and second two-position three-way valves are provided. Each of the first and second three-way valves is hydraulically connected with the master cylinder, the power transmission unit, and at least a selected wheel brake. The first and second three-way valves selectively control hydraulic fluid flow from a chosen one of the master cylinder and the power transmission unit to at least the selected wheel brake. A iso/dump control valve arrangement is hydraulically interposed between at least one of the first and second three-way valves and at least the selected wheel brake. A parallel iso valve arrangement is hydraulically interposed between a selected pump unit and a corresponding wheel brake.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
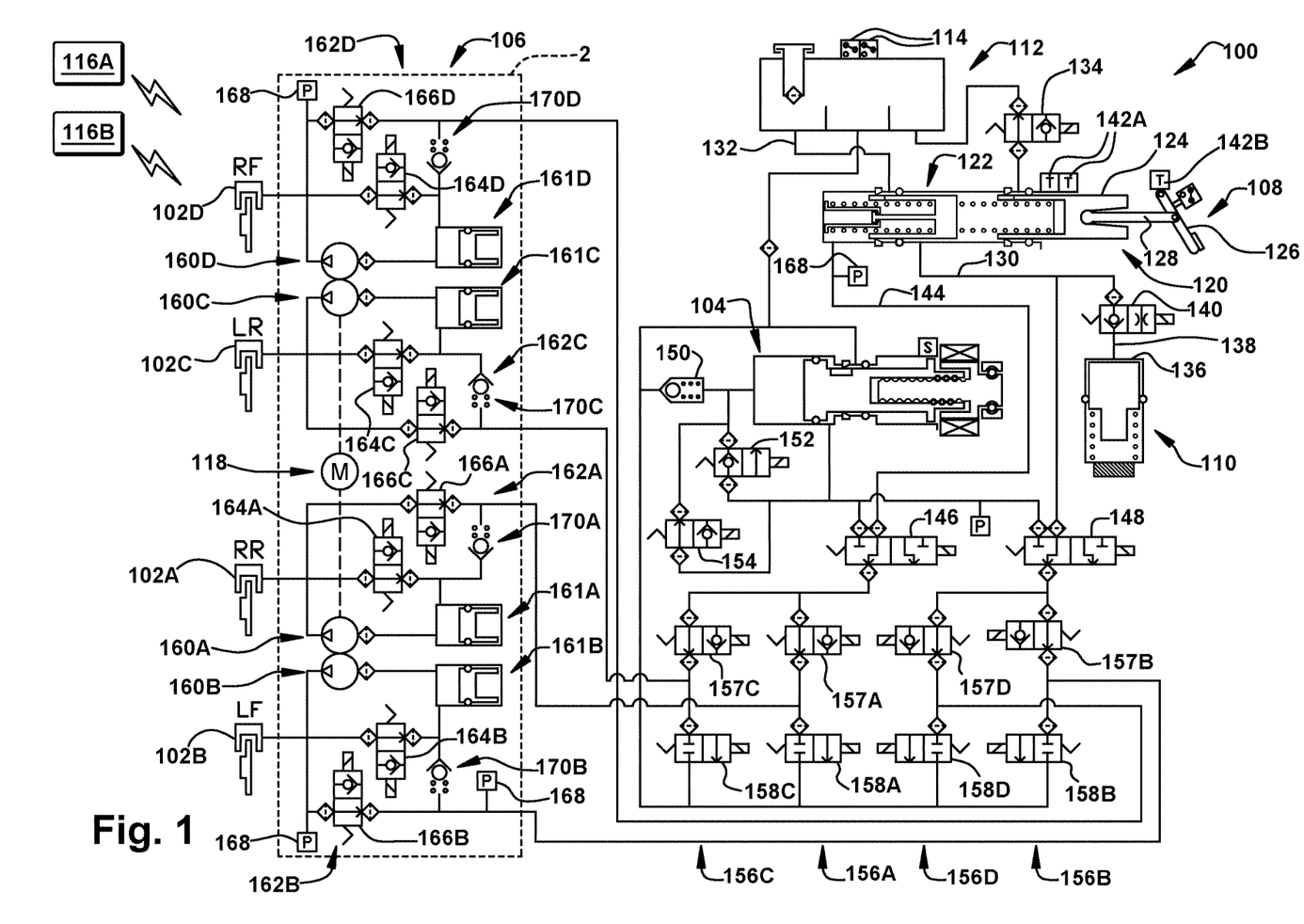
FIG. 1 is a schematic hydraulic diagram of a brake system according to an aspect of the present invention, in a first configuration.
Figure 2:
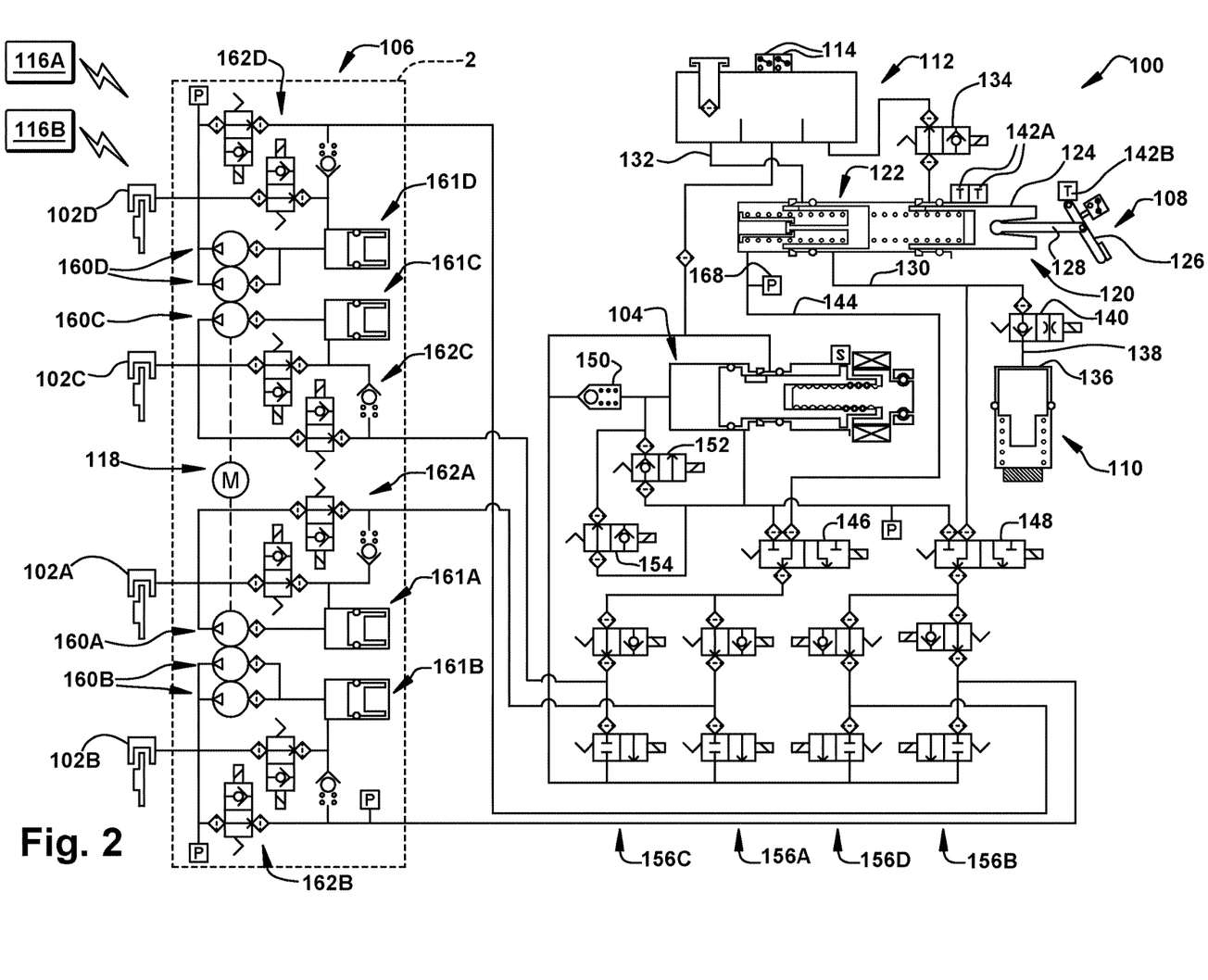
FIG. 2 is a schematic hydraulic diagram of the brake system of FIG. 1, in a second configuration.

FIGS. 1-2 schematically depict a brake system 100 for actuating a pair of front wheel brakes and a pair of rear wheel brakes, in first and second configurations, respectively. The brake system 100 is shown here as a hydraulic braking system in which fluid pressure is utilized to apply braking forces for the brake system 100. The brake system 100 may suitably be used on a ground vehicle, such as an automotive vehicle having four wheels with a wheel brake associated with each wheel. Furthermore, the brake system 100 can be provided with other braking functions such as anti-lock braking (ABS) and other slip control features to effectively brake the vehicle. Components of the brake system 100 may be housed in one or more blocks or housings. The block or housing may be made from solid material, such as aluminum, that has been drilled, machined, or otherwise formed to house the various components. Fluid conduits may also be formed in the block or housing.

In the illustrated embodiment of the brake system 100, there are four wheel brakes 102A, 102B, 102C, and 102D. The wheel brakes 102A, 102B, 102C, and 102D can have any suitable wheel brake structure operated electrically and/or by the application of pressurized brake fluid. Each of the wheel brakes 102A, 102B, 102C, and 102D may include, for example, a brake caliper mounted on the vehicle to engage a frictional element (such as a brake disc) that rotates with a vehicle wheel to effect braking of the associated vehicle wheel. The wheel brakes 102A, 102B, 102C, and 102D can be associated with any combination of front and rear wheels of the vehicle in which the brake system 100 is installed. For example, the brake system 100 may be configured as a vertically split system, as shown, such that pressurized hydraulic fluid is provided from one source (e.g., a single outlet of a master cylinder) for actuating both of the pair of front wheel brakes 102B and 102D and from another source for both of the pair of rear wheel brakes 102A and 102C. In the depicted embodiments of the brake system 100, the power transmission unit 104 provides fluid to all of the pair of front wheel brakes 102B and 102D and the pair of rear wheel brakes 102A and 102C, in the non-failure normal braking mode.

A secondary or backup pressure circuit (indicated generally by the dashed line "2" in the Figures) may include suitable components for selectively providing pressurized hydraulic fluid for actuating the pair of front wheel brakes 102B and 102D and/or the pair of rear wheel brakes 102A and 102C, when the brake system 100 is in at least one enhanced braking mode, as will be discussed in more detail below.

In this example, the wheel brake 102A may be associated with a right rear wheel of the vehicle in which the brake system 100 is installed, and the wheel brake 102B may be associated with the left front wheel. The wheel brake 102C may be associated with the left rear wheel, and the wheel brake 102D may be associated with the right front wheel. Alternatively, though not depicted here, the brake system 100 may be configured as a diagonally split brake system such that two of the wheel brakes 102, as "paired" from one source of hydraulic fluid (e.g., a single output of a master cylinder) are associated with diagonally located wheels of the vehicle, and the other two "paired" wheel brakes 102 are associated with wheels on the other diagonal of the vehicle. (It is contemplated that various other components, such as electric brake motors, could be reconfigured by one of ordinary skill in the art to accommodate such an altered system in certain use environments.)

The brake system 100 also includes a brake pedal unit, indicated generally at 108, a pedal simulator, indicated generally at 110, and a fluid reservoir 112. The reservoir 112 stores and holds hydraulic fluid for the brake system 100. The fluid within the reservoir 112 is preferably held at or about atmospheric pressure, but the fluid may be stored at other pressures if desired. The reservoir 112 is shown schematically having three tanks or sections with fluid conduit lines connected thereto. The sections can be separated by several interior walls within the reservoir 112 and are provided to prevent complete drainage of the reservoir 112 in case one of the sections is depleted due to a leakage via one of the three lines connected to the reservoir 112. Alternatively, the reservoir 112 may include multiple separate housings. The reservoir 112 may include at least one fluid level sensor 114 (two shown, for redundancy) for detecting the fluid level of one or more of the sections of the reservoir 110.

The power transmission unit 104 of the brake system 100 functions as a source of pressure to provide a desired pressure level to the hydraulically operated wheel brakes 102A, 102B, 102C, and 102D during a typical or normal non-failure brake apply. After a brake apply, fluid from the wheel brakes 102A, 102B, 102C, and 102D may be returned to the power transmission unit 104 and/or be diverted to the reservoir 112. In the depicted embodiments, the power transmission unit 108 is shown as being a dual acting plunger type power transmission unit, though a single acting plunger or any other desired type of controllable hydraulic fluid pressurizer could be also or instead provided to the brake system 100. It is also contemplated that other configurations (not shown) of the brake system 100 could include hydraulic control of just a selected one of the pair of front wheel brakes and the pair of rear wheel brakes (with the other pair being electrically controlled/actuated). One of ordinary skill in the art would be readily able to provide such an arrangement for a desired use environment, following aspects of the present invention.

The secondary brake module 106 of the brake system 100 functions as a source of pressure to provide a desired pressure level to selected ones of the wheel brakes 102 in a backup or "failed" situation, when, for some reason, the power transmission unit 104 is unable to provide fluid to those selected wheel brakes. The secondary brake module 106 can be used to selectively provide hydraulic fluid to at least one of the front wheel brakes 102B and 102D and/or the rear wheel brakes 102A and 102C in a backup braking mode, but also in an enhanced braking mode, which can occur on its own and/or concurrently with either the backup braking mode or the non-failure normal braking mode. Examples of suitable enhanced braking mode functions available to the brake system 100 include, but are not limited to, "overboost" (in which higher pressure is provided to a particular brake than would normally be available from a traditional master cylinder arrangement) and "volume-add" (in which more fluid is provided to a particular brake than would normally be available from a traditional master cylinder arrangement). It is contemplated that, for example, overboost could be provided to the pair of front wheel brakes 102B and 102D, and volume add could be provided to the pair of rear wheel brakes 102A and 102C, at the same time or at different times. It is also contemplated that one enhanced mode feature (e.g., overboost) could be applied to one or more of the wheel brakes 102 concurrently with, and/or separately from, another enhanced mode feature (e.g., volume add) being applied to one or more others of the wheel brakes 102. For example, the pair of front wheel brakes 102B and 102D could be placed in an overboost condition concurrently with the rear wheel brakes 102A and 102C being placed in a volume add condition, as desired for a particular use application. One of ordinary skill in the art will be readily able to configure a brake system 100 for any particular use application as desired.

The brake system 100 also includes at least one electronic control unit ("ECU") 116, with primary and secondary ECUs 116A, 116B being shown and described herein. The ECUs 116A, 116B may include microprocessors and other electrical circuitry. The ECUs 116A, 116B receive various signals, process signals, and control the operation of various electrical components of the brake system 100 in response to the received signals, in a wired and/or wireless manner. The ECUs 116A, 116B can be connected to various sensors such as the reservoir fluid level sensor 114, pressure sensors, travel sensors, switches, wheel speed sensors, and steering angle sensors. The ECUs 116A, 116B may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation. Additionally, the ECUs 116A, 116B may be connected to the instrument cluster for collecting and supplying information related to warning indicators such as an ABS warning light, a brake fluid level warning light, and a traction control/vehicle stability control indicator light.

Though not shown here, at least one brake motor may be provided for selectively electrically actuating at least one wheel brake 102 at least in a parking brake mode which acts in a complementary manner to the hydraulically actuated service brakes 102. Whether or not any included brake motor functions during normal non-failure braking as parking brakes, however, a brake motors could be used in a backup mode as an electrically actuated substitute for a hydraulically operated wheel brake 102 when hydraulic operation of the wheel brake is not available, for some reason. The primary and/or secondary electronic control units 116A, 116B may be configured for controlling some combination of at least one of the power transmission unit 104, any available brake motor(s), and the pump motor as desired for a particular use environment, such as responsive to a brake signal obtained, for example, from the brake pedal unit 108.

As shown schematically in FIG. 1, the brake pedal unit 108 includes a master cylinder 120 with a housing 122 defining a longitudinally extending bore for slidably receiving various cylindrical pistons and other components therein. Examples of such components are the first and second springs longitudinally extending in series within the bore, as shown in the Figures. Note that the housing 122 is not specifically schematically shown in the Figures, but instead the walls of the longitudinally extending bore are schematically illustrated. The housing 122 may be formed as a single unit or include two or more separately formed portions coupled together. For some use environments, the master cylinder 120 may be of a tandem master cylinder type.

An MC primary piston 124 is connected with a brake pedal 126 via a linkage arm 128. Leftward movement of the MC primary piston 124 may cause, under certain conditions, a pressure increase within the master cylinder 120.

The pedal simulator 110 is in selective fluid communication with the master cylinder 120 for providing predetermined brake pedal response. As shown, the pedal simulator 110 is connected to the master cylinder 120 via one or more hydraulic passages, but it is contemplated that the "selective fluid communication" could be provided via integration of the pedal simulator 110 into the master cylinder 120.

More specifically, the master cylinder 120 is in fluid communication with the pedal simulator 110 via a master cylinder passage 130. The MC primary piston 124 is slidably disposed in the bore of the housing 122 of the master cylinder 120. When the brake pedal unit 108 is in its rest position (the driver is not depressing the brake pedal 126), the structures of the master cylinder 120 permit at least a portion of fluid communication between the bore of the housing 122 and the reservoir 112 via a reservoir conduit 132. The pedal simulator 110 is therefore in selective fluid communication with the master cylinder 120 for providing predetermined brake pedal 126 response to the driver (e.g., brake pedal "feel").

The brake system 100 may further include an optional solenoid actuated simulator test valve 134 which may be electronically controlled between an open position and a powered closed position; the simulator test valve 134 may include a test valve spring biasing the simulator test valve 134 toward an open condition. The simulator test valve is located fluidly between the reservoir 112 and the master cylinder 120 to selectively permit fluid communication therebetween. The simulator test valve 134 may not be needed during a normal brake apply or for a manual push-through mode. The simulator test valve 134 can be actuated to resist opening under predetermined pressure(s) during various testing modes to determine the correct operation of other components of the brake system 100. For example, the simulator test valve 134 may be actuated to a closed position to prevent venting to the reservoir 112 via the reservoir conduit 132 to monitor fluid flow to determine whether leaks may be occurring through seals of various components of the brake system 100.

A simulation pressure chamber 136 of the pedal simulator 110 is in fluid communication with the pedal simulator passage 138, which is in fluid communication with the master cylinder 120 of the brake pedal unit 108 via simulator valve 140. One example of desired operation of the simulator valve is during a failed and/or initial/startup condition, in which the brake pedal unit 108 is utilized to provide a source of pressurized fluid to the wheel brakes 102A, 102B, 102C, and 102D in a push-through manner, as described herein.

The brake pedal unit 108 is connected to the brake pedal 126 and is actuated by the driver of the vehicle as the driver presses on the brake pedal 126. A brake sensor or switch 142 (three shown, for redundancy) may be electrically connected to the ECUs 116A, 116B to provide a brake signal indicating a depression of the brake pedal 126. The brake signal may be of a binary (brake off/on) type and/or a proportional/graduated signal indicating speed, acceleration, duration, and/or amount of depression of the brake pedal 126. That is, the master cylinder 120 is operable to provide a brake signal responsive to actuation of the brake pedal 126 connected thereto.

The brake pedal unit 108 may be used as a back-up source of pressurized fluid to essentially replace the normally supplied source of pressurized fluid from the power transmission unit 104 under certain failed conditions of the brake system 100, and/or upon initial startup of the brake system 100. This situation is referred to as a manual push-through event, or a "manual apply" and may be accomplished in coordination with actuation of the secondary power transmission unit 106 or independently thereof.

In such a push-through mode, the brake pedal unit 108 can supply pressurized fluid to at least one of a master cylinder output 144 and the master cylinder passage 130, which is then routed to the wheel brakes 102A, 102B, 102C, and 102D as desired. This flow is pushed through, largely under mechanical pressure upon the brake pedal 126 from the driver's foot, from the master cylinder 120. That is, the master cylinder 120 is selectively operable during a manual push-through mode by actuation of the brake pedal 126 connected to the master cylinder 120 to generate brake actuating pressure to at least one of a first output (here, schematically shown as master cylinder passage 130) and a second output (here, schematically shown as master cylinder output 144) for hydraulically actuating at least one of the pair of front wheel brakes 102B, 102D and the pair of rear wheel brakes 102A, 102C.

First and second two-position three-way valves 146 and 148, respectively, are provided to the brake system 100 as shown in the Figures. Each of the first and second three-way valves 146 and 148 is hydraulically connected with the master cylinder 120, the power transmission unit 104, and at least a selected wheel brake of each of the pairs of the front and rear wheel brakes 102. For example, and as shown in the Figures, the first three-way valve 146 is in fluid communication with the left and right rear wheel brakes 102A, 102C, and the second three-way valve 148 is in fluid communication with the left and right front wheel brakes 102B, 102D. The first and second three-way valves 146 and 148 selectively control hydraulic fluid flow from a chosen one of the master cylinder 120 and the power transmission unit 104 to at least the selected ones of the front and rear wheel brakes 102. Through use of the first and second three-way valves 146 and 148, hydraulic fluid can be routed to the wheel brakes 102 in a desired manner (from either the master cylinder 120 or the power transmission unit 104) to assist with boosted braking control and provide desired response times and efficient pressure flow to the respective wheel brakes 102 associated with each three-way valve. A single three-way valve 146 or 148 is shown as being used here instead of one normally-closed valve and one normally-open valve for cost and packaging reasons, but also to reduce current draw. This is mainly because the normally-open valve may, in some use environments, need an undesirably high force spring to avoid it becoming hydraulically locked closed if power is lost during a boosted brake apply, which could trap brake pressure and/or cause unwanted braking when the pedal is released.

The Figures also depict a replenishing check valve 150, which is located fluidically between the reservoir 112 and the power transmission unit 104. When present, the replenishing check valve 150 may be provided to assist with refilling of the power transmission unit 104 (or components thereof) under predetermined conditions. For example, the replenishing check valve 150 may help to facilitate refilling of the chamber in front of the dual-acting plunger ("DAP") head when a DAP-type power transmission unit 104 is building pressure during its retraction stroke by pushing fluid out of the annular chamber behind the DAP head. This is done, for example, during slip control if additional flow to the brakes is needed after the DAP is stroked fully forward.

A normally closed dual-acting plunger ("DAP") valve 152 and a normally open DAP valve 154 are interposed hydraulically between the power transmission unit 104 and at least one of the first and second three-way valves 146, 148.

Iso/dump control valve arrangements 156 are interposed hydraulically between the power transmission unit 104 and the pairs of front and rear wheel brakes 102B, 102D and 102A, 102C. The iso/dump control valve arrangements 156 are each controlled by the first ECU 116A. The iso/dump control valve arrangements 156 each include respective serially arranged ABS iso and ABS dump valves 157 and 158. The normally open iso valve 157 for each iso/dump control valve arrangement 156 is located hydraulically between a respective wheel brake 102 and the power transmission unit 104, and the normally closed dump valve 158 for each iso/dump control valve arrangement 156 is located hydraulically between a respective wheel brake 102 and the reservoir 112, for the corresponding wheel brake 102. Here, for clarity in the Figures, the iso and dump valves 157 and 158 (as well as each iso/dump control valve arrangement 156 in general) are appended with the letter "B" or "D", referencing a respective front wheel brake 102B and 102D, or the letter "A" or "C", referencing a respective rear wheel brake 102A and 102C, with which the so-labeled valves are respectively associated.

As shown in FIGS. 1-2, the iso/dump control valve arrangements 156 may be interposed hydraulically between respective first or second three-way valves 146, 148 and corresponding ones of the pair of hydraulically actuated brakes.

Thus, each iso/dump control valve arrangement 156 downstream of the power transmission unit 104 includes iso and dump valves 157 and 158 which are controlled between their open and closed positions to provide different braking pressures among the wheel brakes 102, as desired for a particular braking situation. The iso/dump control valve arrangements 156 may selectively provide slip control to at least one wheel brake 102 of the pair of front wheel brakes 102B, 102C and the pair of rear wheel brakes 102A, 102D powered by the power transmission unit 104. More broadly, the iso/dump control valve arrangement 156, and/or other valves of the brake system 100, any of which may be solenoid-operated and have any suitable configurations, can be used to help provide controlled braking operations, such as, but not limited to, ABS, traction control, vehicle stability control, dynamic rear proportioning, regenerative braking blending, and autonomous braking.

Focusing now on the secondary braking module 106 schematically indicated by dashed line "2" in FIGS. 1-2, a secondary arrangement is provided to power and control one or more of the wheel brakes 102 hydraulically in the event of loss of fluid power from the power transmission unit 104, as part of an enhanced braking mode, or for any other reason. As shown in the Figures, the secondary braking module 106 of the brake system 100 is configured to selectively provide hydraulic fluid to at least one of (in the depicted configuration, all four of) the pair of front wheel brakes 102B, 102D and the pair of rear wheel brakes 102A, 102C in an enhanced braking mode.

As shown in the Figures, the secondary braking module 106 may include a pump motor (e.g., electrically driven pump motor 118) for driving at least one pump unit 160 associated with a correlated wheel brake 102. Each pump unit 160 is operatively connected to a fluid accumulator 161 (e.g. the free-floating piston type, with no spring, shown schematically in the Figures). The pump unit 160 and fluid accumulator 161 are cooperatively actuated for selectively varying an amount of hydraulic fluid provided to the correlated wheel brake.

At least one pump unit 160 may be, for example, of a pump piston type, or may be of any desired type including, but not limited to, piston pumps, gear pumps, gerotor pumps, and vane pumps, and/or any combination thereof. The pump unit 160 could include an integrated pump motor (not shown), also or instead of the separate, "master" pump motor 118 as shown in the Figures. When the pump unit 160 is a pump piston of a rotary-type pump, there may be at least one pump piston provided for each wheel brake 102. It is contemplated that the secondary electronic control unit 116B may control at least one of the pump motor 118 and at least one pump unit 160 in the enhanced braking mode (regardless of the normal/backup mode status of the brake system 100), responsive to a brake signal generated by the brake pedal unit 108.

Regardless of the type of pump unit 160 and control scheme provided, the fluid accumulator(s) 161 assist with selectively providing hydraulic fluid to the corresponding wheel brake(s) 102 above the amount of hydraulic fluid that could be provided, for example, by the master cylinder 120 in a manual push-through or backup braking mode. Particularly for very large trucks, the wheel brakes 102 may be large enough that the master cylinder 120 cannot readily move enough hydraulic fluid to both provide desired braking responses and pedal "feel" for the operator. Accordingly, the fluid accumulator(s) 161 can serve as a local-to-the-brake pseudo-reservoir, such that the wheel brakes 102 have no need to additionally draw hydraulic fluid from the reservoir 112 in particular situations. In fact, in some use environments, the secondary brake module 106 may be only indirectly connected to the reservoir 112, with the master cylinder 120 interposed fluidically therebetween. Check valve 170 may be provided to the secondary brake module 106, as desired, to prevent the fluid accumulator(s) 161 from refilling from the master cylinder 120 during enhanced braking modes including overboost or volume add.

In FIGS. 1-2, a parallel iso valve arrangement 162 is provided to each of the wheel brakes 102, as a part of the secondary brake module 106. The parallel iso valve arrangement 162 is hydraulically interposed between a corresponding iso/dump control valve arrangement 156 and a corresponding wheel brake 102. Each parallel iso valve arrangement 162 for a wheel brake 102 includes first and second parallel iso valves 164 and 166, respectively. Each parallel iso valve arrangement 162 may assist with providing pressure build in a corresponding wheel brake 102 when there is a failure of the power transmission unit 104, the primary ECU 116A, or any other component that would otherwise, if working correctly, be contributing to a normal, non-failure braking mode/condition. Each parallel iso valve arrangement 162 may also or instead assist with providing an enhanced braking mode, as previously mentioned.

Much like the primary electronic control unit 116A may control at least one iso/dump control valve arrangement in a non-failure normal braking mode to provide a slip control (e.g., traction compensation) feature to a corresponding wheel brake 102, the secondary electronic control unit 1168 may control at least one of the parallel iso valve arrangements 162 in a backup braking mode to provide an enhanced braking feature (e.g., overboost and/or volume add), and/or some degree of a slip control (e.g., traction compensation) feature, to a corresponding wheel brake 102.

As mentioned above, at least one brake sensor 142 may facilitate the provision of a brake signal to the primary and/or secondary electronic control units 116A, 1168. While at least one brake sensors 142A (two provided, for redundancy) are shown in the Figures as providing brake signals responsive to actuation of the brake pedal 126 as evidenced by travel of the master cylinder primary piston 124 (directly or indirectly), the brake system 100 also may include another brake sensor 142B. When brake sensor 142B is present, it may be located remotely from brake sensor(s) 142A (e.g., those that provide a brake signal to the primary electronic control unit 116A), and be operatively attached to the brake pedal 126 for providing a brake signal to the secondary electronic control unit 1168, responsive to actuation of the brake pedal 126.

The brake signal from the brake sensor 142B may be useful in directing operation of the secondary brake module 106, particularly in a backup braking mode, in which the secondary brake module 106 is assisting manual push-through from the master cylinder 120 to provide an enhanced braking braking mode function (e.g., volume add and/or overboost, to at least one wheel brake 102). This function of the brake sensor 1428 may be helpful, for example, when all of the brake sensors 142A are unavailable—e.g., when the brake system 100 is in a backup braking mode—and it is desired, for example, for the wheel brakes 102 of one axle (front/rear) to be in an overboost mode and the wheel brakes 102 of another axle (rear/front) to be in a volume add mode, such as due to local driving conditions, vehicle loading, and/or any other reason(s).

The secondary brake module 106 may include at least one pressure sensor 168 (three shown), at any desired location(s), to provide a pressure signal to the secondary electronic control unit 1168 responsive to a sensed hydraulic fluid pressure at a corresponding location of the secondary brake module 106. This pressure signal may be used for any desired reason such as, but not limited to, facilitating closed loop control of at least a portion of the brake system 100, detecting and/or verifying pressurization of the hydraulic fluid, and/or for any other reason. Pressure of hydraulic fluid may be sensed, directly or indirectly, with a pressure sensor (shown generally as "P") at any desired location(s) in the brake systems 100, though the pressure sensors 168 are shown as examples in the secondary brake module 106. It is contemplated that any provided pressure sensor(s) 168 may be in electrical communication with at least one of the primary and secondary electronic control units 116A, 1168, in a wired or wireless manner, to communicate pressure signals thereto responsive to sensed fluid pressure(s), as desired for a particular use environment.

It is contemplated that the components located inside dashed line "2" in FIG. 1 may be spaced apart in the vehicle, hydraulically if not also mechanically, from components outside that line (i.e., by being located remote from one another within the brake system 100, and at least apart from a common housing or block). One of ordinary skill in the art will readily be able to provide suitable parallel iso valve arrangements 162, pump units 160, fluid accumulators 161, pump motor(s) 118, or any other secondary brake module 106 components for a desired use environment of the present invention.

Using the arrangement of valves in the Figures, the fluid pressures at each of the wheel brakes 102 can be controlled independently from one another during normal, non-failure operation even though the brake system 100 may include a single source of pressure (e.g., power transmission unit 104 and/or master cylinder 120). Additionally, the secondary brake module 106 could provide a "brake by wire" or autonomous braking function to the brake system 100 in the event of failure of both the power transmission unit 104 and master cylinder 120, due at least in part to the hydraulic fluid contained in the fluid accumulator(s) 161.

With reference now to FIG. 2, a second configuration of the brake system 100 is depicted, parts or all of which can be used with other components of the present invention, as desired. Description of similar components and operation which is made elsewhere in this application will not necessarily be repeated for each and every described configuration or aspect of the brake system 100, for brevity, but should instead be considered to apply to like-numbered portions of other configurations as appropriate.

In the brake system 100 shown in FIG. 2, two pump units 160 are shown for at least one of the wheel brakes 102 (here, for each of the pair of front wheel brakes 102A, 102C). This "differential placement" of pump units 160 may be provided for any desired reason. For example, when each pump unit 160 is a pump piston of a rotary-type pump, there may be flow ripple advantages to having more pump pistons than merely four (when one is provided to each wheel brake 102). It may also be desirable, in some use environments, to build pressure in the front wheel brakes 102A, 102C before the rear wheel brakes 1028, 102D. It is also contemplated that one or more of the wheel brakes 102 could be omitted from the secondary brake module 106 arrangement entirely, with no corresponding pump unit 160 or fluid accumulator 161 associated therewith. One of ordinary skill in the art will be readily able to configure the pump units 160 of a brake system 100 as desired for a particular use environment.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A brake system for actuating at least one wheel brake of a pair of front wheel brakes and a pair of rear wheel brakes, the system comprising:
   a reservoir;
   a master cylinder operable to provide a brake signal responsive to actuation of a brake pedal connected thereto, the master cylinder being selectively operable during a manual push-through mode by actuation of the brake pedal to generate brake actuating pressure to at least one output for hydraulically actuating at least one wheel brake;
   a power transmission unit configured for selectively providing pressurized hydraulic fluid for actuating at least one of the wheel brakes in a non-failure normal braking mode;
   a secondary braking module configured for selectively providing hydraulic fluid to each of the wheel brakes in an enhanced braking mode, each wheel brake having an associated fluid accumulator, the secondary braking module including a pump motor driving at least one pump unit associated with a correlated wheel brake, each pump unit being operatively connected to the fluid accumulator associated with the correlated wheel brake for selectively varying an amount of hydraulic fluid provided to the correlated wheel brake;
   a primary electronic control unit for controlling the power transmission unit responsive to the brake signal;
   a secondary electronic control unit for controlling the pump motor responsive to the brake signal;
   first and second two-position three-way valves, each of the first and second three-way valves being hydraulically connected with the master cylinder, the power transmission unit, and at least a selected wheel brake, the first and second three-way valves selectively controlling hydraulic fluid flow from a chosen one of the master cylinder and the power transmission unit to at least the selected wheel brake;

an isolation and dump control valve arrangement hydraulically interposed between at least one of the first and second three-way valves and at least the selected wheel brake; and a parallel isolation valve arrangement hydraulically interposed between a selected pump unit and a corresponding wheel brake.

2. The brake system of claim 1, wherein the power transmission unit is of a dual acting plunger type.

3. The brake system of claim 1, wherein the pump unit is of a pump piston type.

4. The brake system of claim 3, wherein each pump unit is a pump piston of a rotary-type pump, having at least one pump piston for each wheel brake.

5. The brake system of claim 1, wherein at least two pump units are provided for at least one of the wheel brakes.

6. The brake system of claim 5, wherein each pump unit is a pump piston of a rotary-type pump, having at least two pump pistons for each of the pair of front wheel brakes.

7. The brake system of claim 1, including a normally closed DAP valve and a normally open DAP valve interposed hydraulically between the power transmission unit and the first and second three-way valves.

8. The brake system of claim 1, wherein the master cylinder includes a housing defining a longitudinally extending bore, and first and second springs longitudinally extending in series within the bore.

9. The brake system of claim 1, wherein each isolation and dump control valve arrangement selectively provides slip control to a corresponding wheel brake.

10. The brake system of claim 9, wherein each isolation and dump control valve arrangement includes a corresponding iso valve and a corresponding dump valve for a corresponding wheel brake.

11. The brake system of claim 1, wherein each parallel isolation valve arrangement includes first and second parallel [iso] isolation valves for a corresponding wheel brake.

12. The brake system of claim 1, wherein at least one of the master cylinder and the brake pedal includes at least two brake sensors, each brake sensor providing a brake signal responsive to actuation of the brake pedal, a chosen one of the brake sensors providing a brake signal to the primary electronic control unit, and an other one of the brake sensors providing a brake signal to the secondary electronic control unit.

13. The brake system of claim 1, wherein the secondary electronic control unit controls at least one of the pump motor and the at least one pump unit in the enhanced braking mode, responsive to the brake signal.

14. The brake system of claim 1, wherein the primary electronic control unit controls at least one isolation and dump control valve arrangement in a non-failure normal braking mode to provide a slip control feature to a corresponding wheel brake.

15. The brake system of claim 1, wherein the secondary electronic control unit controls at least one parallel isolation valve arrangement in a backup braking mode to provide a slip control feature to a corresponding wheel brake.

16. The brake system of claim 1, wherein the secondary brake module is indirectly connected to the reservoir, with the master cylinder interposed fluidically therebetween.

17. The brake system of claim 1, wherein the secondary brake module includes at least one pressure sensor configured to provide a pressure signal to the secondary electronic control unit responsive to a sensed hydraulic fluid pressure in the secondary brake module.

18. The brake system of claim 1, wherein the master cylinder is of a tandem master cylinder type.

19. The brake system of claim 1, including a pedal simulator in selective fluid communication with the master cylinder for providing predetermined brake pedal response.

* * * * *